United States Patent
Lee et al.

(10) Patent No.: US 11,536,655 B1
(45) Date of Patent: Dec. 27, 2022

(54) IMAGING SYSTEMS WITH ANGLED SENSORS AND RELATED METHODS

(71) Applicant: PathAI, Inc., Boston, MA (US)

(72) Inventors: Justin Lee, Cambridge, MA (US); Hsiou-Yuan Liu, Brookline, MA (US); Bikram Yonjan, Woburn, MA (US); Bo Yang Yu, Winchester, MA (US); Yibo Zhang, Brookline, MA (US)

(73) Assignee: Path AI, Inc., Boston, MA (US)

( * ) Notice: Subject to any disclaimer, the term of this patent is extended or adjusted under 35 U.S.C. 154(b) by 0 days.

(21) Appl. No.: 17/177,668

(22) Filed: Feb. 17, 2021

Related U.S. Application Data

(60) Provisional application No. 62/978,211, filed on Feb. 18, 2020, provisional application No. 62/978,226, filed on Feb. 18, 2020.

(51) Int. Cl.
*G01D 18/00* (2006.01)
*G01N 21/47* (2006.01)
(Continued)

(52) U.S. Cl.
CPC ....... *G01N 21/4788* (2013.01); *G02B 21/008* (2013.01); *G02B 21/0032* (2013.01); *G02B 21/0048* (2013.01); *G02B 21/26* (2013.01); *G02B 26/105* (2013.01); *G02B 27/4227* (2013.01); *G06T 5/50* (2013.01); *H04N 5/2258* (2013.01); *H04N 5/2259* (2013.01); *H04N 5/2354* (2013.01); *G01N 2201/068* (2013.01);
(Continued)

(58) Field of Classification Search
CPC ......... G01N 21/4788; G01N 2201/068; G02B 21/0032; G02B 21/0048; G02B 21/008; G02B 21/26; G02B 26/105; G02B 27/4227; G06T 5/50; G06T 2207/10056; G06T 2207/10152; G06T 2207/20212; G06T 2207/30024; H04N 5/2258; H04N 5/2259; H04N 5/2354
See application file for complete search history.

(56) References Cited

U.S. PATENT DOCUMENTS

| 5,796,500 A | * | 8/1998 | Hart | ......................... G03H 1/22 359/24 |
| 2004/0070669 A1 | * | 4/2004 | Aoyama | ................ H04N 17/02 348/188 |

(Continued)

*Primary Examiner* — Howard D Brown, Jr.
(74) *Attorney, Agent, or Firm* — Wolf, Greenfield & Sacks, P.C.

(57) ABSTRACT

Diffraction-based imaging systems are described. Aspects of the technology relate to imaging systems having one or more sensors inclined at angles with respect to a sample plane. In some cases, multiple sensors may be used that are, or are not, inclined at angles. The imaging systems may have no optical lenses and are capable of reconstructing microscopic images of large sample areas from diffraction patterns recorded by the one or more sensors. Some embodiments may reduce mechanical complexity of a diffraction-based imaging system. A diffractive imaging system comprises a light source, a sample support configured to hold a sample along a first plane, and a first sensor comprising a plurality of pixels disposed in a second plane that is tilted at an inclined angle relative to the first plane. The first sensor is arranged to record diffraction images of the light source from the sample.

23 Claims, 12 Drawing Sheets

(51) Int. Cl.

| | |
|---|---|
| *H04N 5/225* | (2006.01) |
| *G06T 5/50* | (2006.01) |
| *G02B 21/00* | (2006.01) |
| *G02B 21/26* | (2006.01) |
| *G02B 27/42* | (2006.01) |
| *G02B 26/10* | (2006.01) |
| *H04N 5/235* | (2006.01) |

(52) U.S. Cl.
CPC ............ *G06T 2207/10056* (2013.01); *G06T 2207/10152* (2013.01); *G06T 2207/20212* (2013.01); *G06T 2207/30024* (2013.01)

(56) References Cited

U.S. PATENT DOCUMENTS

| | | | |
|---|---|---|---|
| 2007/0206192 | A1 | 9/2007 | Fomitchov et al. |
| 2011/0049344 | A1* | 3/2011 | Dobashi ................ H01J 37/222 250/252.1 |
| 2011/0109893 | A1* | 5/2011 | Gruner ................ G03F 7/70108 355/71 |
| 2013/0161399 | A1* | 6/2013 | He ........................... G06K 7/14 235/462.41 |
| 2017/0220000 | A1 | 8/2017 | Ozcan et al. |
| 2018/0195974 | A1 | 7/2018 | Kress et al. |
| 2019/0073795 | A1 | 3/2019 | Matsuzawa |
| 2020/0209757 | A1 | 7/2020 | Butler et al. |
| 2020/0237229 | A1 | 7/2020 | Fei |
| 2022/0086419 | A1* | 3/2022 | Qaderi ................ G03H 1/2294 |

* cited by examiner

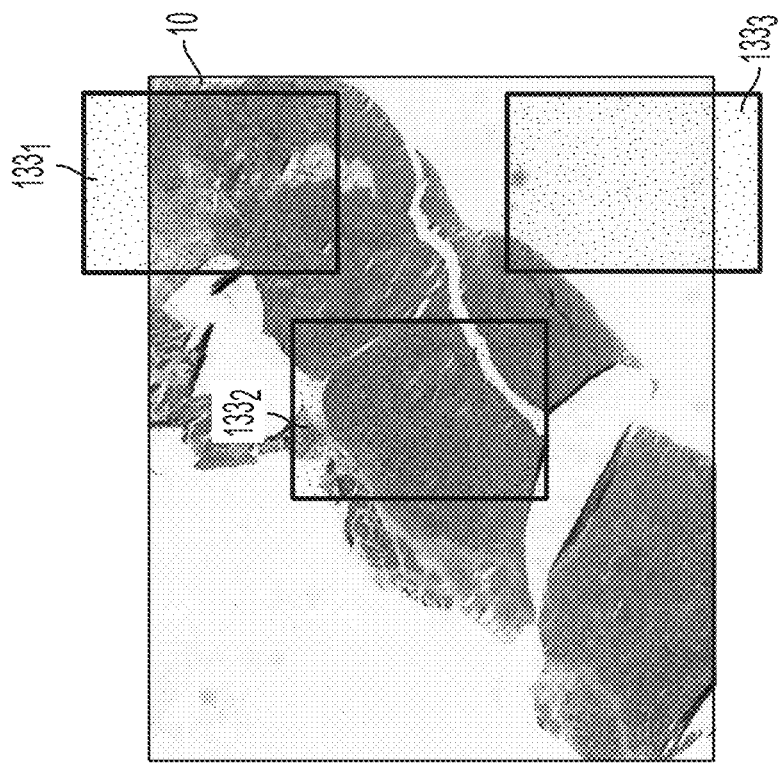
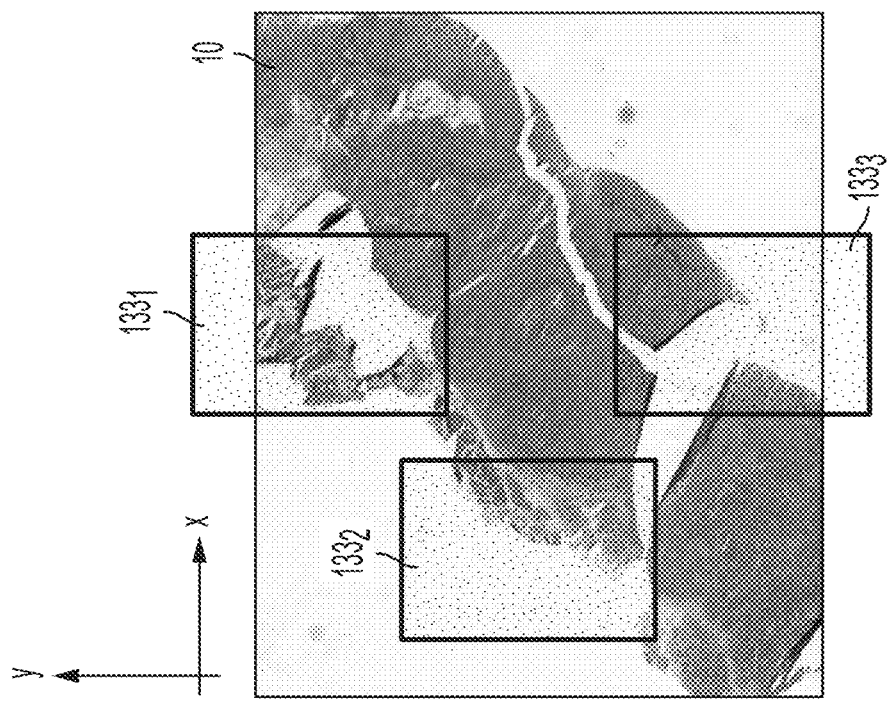
FIG. 3B
FIG. 3A

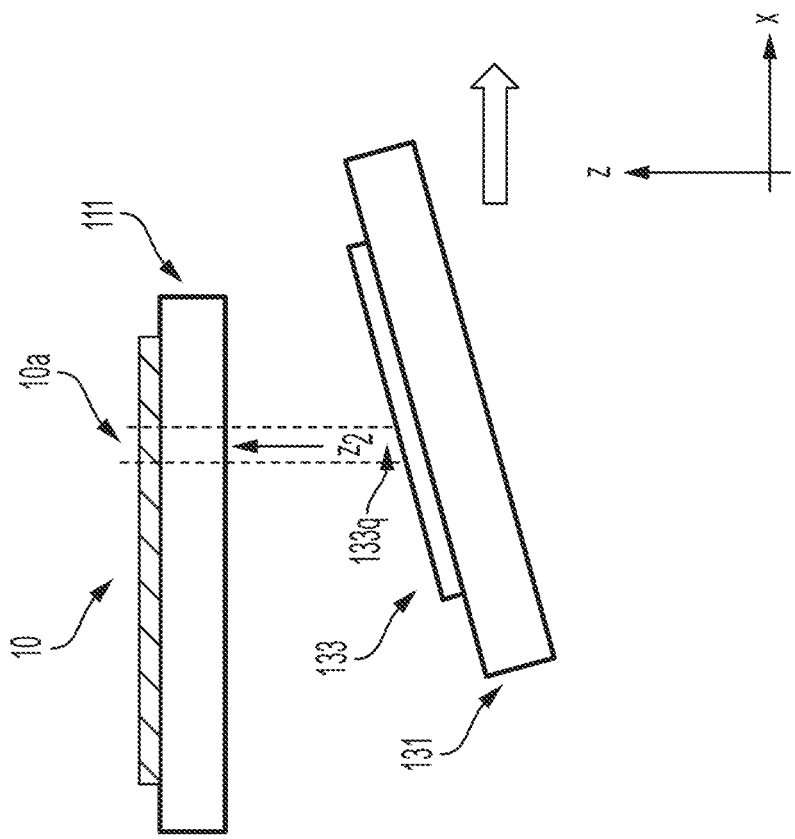
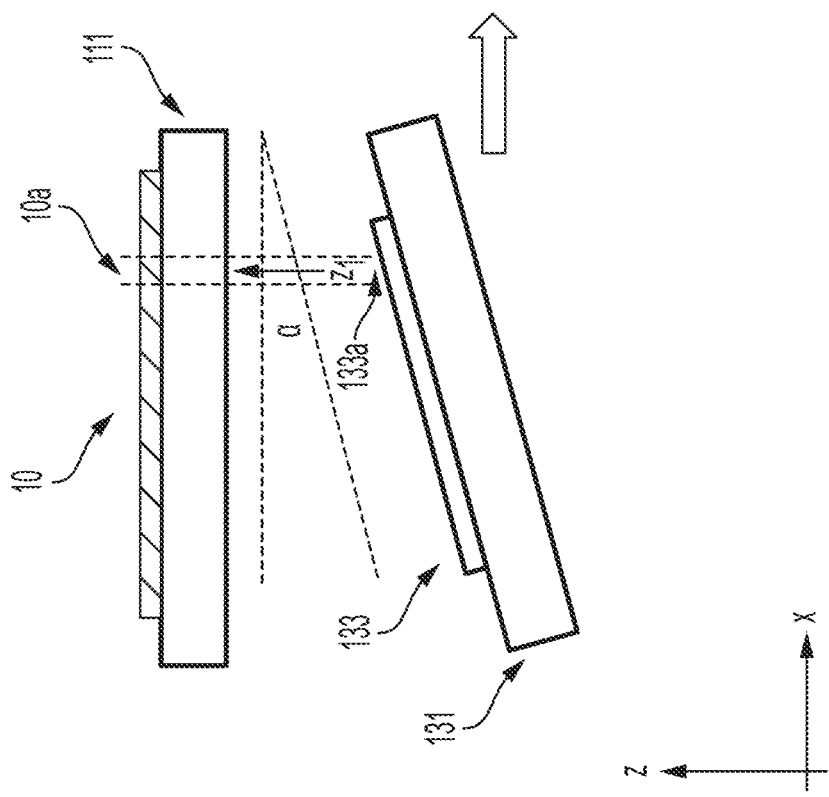
FIG. 9B
FIG. 9A

IMAGING SYSTEMS WITH ANGLED SENSORS AND RELATED METHODS

CROSS-REFERENCE TO RELATED APPLICATIONS

This application claims the benefit under 35 U.S.C. § 119(e) to U.S. Provisional Patent Application Ser. No. 62/978,211, titled "IMAGING SYSTEMS WITH ANGLED SENSORS AND RELATED METHODS," filed on Feb. 18, 2020, and U.S. Provisional Patent Application Ser. No. 62/978,226, titled "MULTI-SENSOR IMAGING SYSTEMS AND RELATED METHODS," filed on Feb. 18, 2020, which are hereby incorporated by reference herein in their entirety.

BACKGROUND

Cancer is one of the leading causes of death in the United States. Each year over 1.5 million people are newly diagnosed with cancer in the United States alone. Over 500,000 Americans die from cancer annually and many more suffer from it. The burden of the disease is not limited to cancer patients but extends to their families and social circles. The loss of a loved one can be devastating, and even when the cancer patient survives, the uncertainty is emotionally trying. Cancer exacts an economic toll as well: the estimated direct medical costs for cancer treatment in the United States in 2014 were $87.8 billion, and some sources project that this number could exceed $200 billion in the near future. In addition to cancer, other burdensome diseases, such as Alzheimer's disease, Parkinson's disease, diabetes, cystic fibrosis, sickle cell anemia, and autoimmune diseases, continue to affect the lives of millions of people, either directly or indirectly, every year.

While significant resources have been dedicated to treating such diseases, in almost all cases, early and accurate detection is crucial to successful outcomes. Furthermore, because many treatments are painful and carry their own set of patient risks, accurate diagnoses are essential before beginning treatment. It is for that reason that preliminary screens such as mammograms, prostate exams, and pap tests are followed up with tissue biopsies when abnormalities are found.

SUMMARY

Some embodiments of diffraction-based imaging systems are described. A diffractive imaging system is capable of producing microscopic images of a sample from recorded diffraction patterns. Some aspects of the technology relate to imaging systems having one or more sensors inclined at angles with respect to a sample plane. In some cases, multiple sensors may be used that are not inclined at angles. The imaging systems may have no optical lenses and are capable of reconstructing microscopic images of large sample areas from diffraction patterns recorded by the one or more sensors. Some embodiments may reduce mechanical complexity of a diffraction-based imaging system.

Some embodiments relate to a diffractive imaging system comprising a light source; a sample support configured to hold a sample along a first plane; and a first sensor comprising a plurality of pixels disposed in a second plane that is tilted at an inclined angle relative to the first plane. The first sensor is arranged to record diffraction images of the light source from the sample.

In some embodiments, the first sensor is configured to move relative to the sample support, and/or the sample support is configured to move relative to the first sensor, along a first direction that is approximately parallel to the first plane.

In some embodiments, the first sensor is configured to move relative to the sample support, and/or the sample support is configured to move relative to the first sensor, only along the first direction.

In some embodiments, there are no lenses between the sample support and the first sensor.

In some embodiments, the diffractive imaging system further comprises a second sensor comprising a plurality of pixels disposed in a third plane that is tilted at an angle with respect to the first plane, wherein the second sensor is arranged to record diffraction images of the light source from the sample.

In some embodiments, the first sensor and second sensor are configured to move relative to the sample support along a first direction that is approximately parallel to the first plane.

In some embodiments, the first sensor and second sensor are configured to move relative to the sample support along the first direction and record diffraction patterns from a same portion of the sample.

In some embodiments, the diffractive imaging system further comprises a light source driver configured to cause the light source to flash on and off.

In some embodiments, the signal is synchronized with an exposure time for the first sensor.

In some embodiments, the diffractive imaging system further comprises positioning apparatus arranged to move the light source.

In some embodiments, the positioning apparatus comprises an electromagnetic actuator configured to move the light source in a first direction that is approximately parallel to the first plane.

In some embodiments, the diffractive imaging system further comprises at least one rotating mirror that is arranged to change an incident angle of radiation from the light source on the sample.

In some embodiments, the rotating mirror is driven by a galvanometer.

In some embodiments, the diffractive imaging system further comprises an acquisition device comprising at least one processor adapted to partition diffraction image data from the sensor into a plurality of groups corresponding to different sections of the sensor; and determine an image for a same portion of the sample based on first diffraction image data from a first section of the sensor and second diffraction image data from a second section of the sensor different from the first section.

In some embodiments, the at least one processor is further adapted to compensate for the angle when computing an in-focus image for the sample.

Some embodiments relate to a method for imaging a sample on a sample support that is configured to hold the sample along a first plane. The method comprises illuminating the sample using a light sources and recording a first diffraction pattern of the light source from the sample with a first sensor arranged in a second plane that is tilted at an inclined angle relative to the first plane.

In some embodiments, the method further comprises moving the sample support relative to the sensor, and/or moving the sensor relative to the sample support, along a direction approximately parallel to the first plane; recording a second diffraction pattern from the sensor; and reconstructing a microscopic image of a portion of the sample using a first portion of the first diffraction pattern that was recorded by a first portion of the sensor and a second portion of the second diffraction pattern that was recorded by a second portion of the sensor different from the first portion of the sensor.

In some embodiments, the method further comprises determining a characteristic of the sample based at least on the microscopic image.

In some embodiments, the method further comprises modulating the light source on and off in synchronization with a shutter of the sensor.

In some embodiments, the method further comprises rotating a mirror to change a virtual image location of the light source; and recording a second diffraction pattern from the sample with the first sensor.

In some embodiments, the method further comprises constructing a sub-pixel resolution diffraction image based on the first diffraction pattern and the second diffraction pattern.

In some embodiments, the method further comprises changing a location of the light source with an electromagnetic actuator; and recording a second diffraction pattern from the sample with the first sensor.

Some embodiments relate to diffractive imaging systems comprising one or more light sources, a sample support configured to hold a sample along a first plane, two or more sensors, each comprising a plurality of pixels and configured to image diffraction patterns produced by the sample, and apparatus configured to move the two or more sensors relative to the sample support in a first direction parallel or approximately parallel to the first plane. The total amount of movement of the two or more sensors can be at least one-half the width or length of a sensor of the two or more sensors.

Some embodiments relate to methods for imaging a sample with multiple sensors. An exemplary method can comprise acts of: supporting the sample on a sample support that is configured to hold the sample along a first plane; illuminating the sample with one or more light sources; imaging, with two or more sensors that each comprising a plurality of pixels, first diffraction patterns produced by the sample; moving the two or more sensors relative to the sample support in a first direction parallel or approximately parallel to the first plane; imaging, with two or more sensors that each comprising a plurality of pixels, second diffraction patterns produced by the sample; and reconstructing an image of the sample from at least the first diffraction patterns and the second diffraction patterns. The total amount of movement of the two or more sensors can be at least one-half the width or length of a sensor of the two or more sensors.

The foregoing summary is provided by way of illustration and is not intended to be limiting. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A and FIG. 3B are top views illustrating staggered sensor locations in an exemplary diffraction imaging system, in accordance with some embodiments of the technology described herein;

FIG. 9A and FIG. 9B depict a diffraction imaging system in which a sensor is angled relative to a sample, in accordance with some embodiments of the technology described herein.

DETAILED DESCRIPTION

I. Overview

Lens-free imaging systems are gaining interest for medical and other applications in which microscopic images of samples are needed. A lens-free imaging system can produce images of samples, such as tissue samples, that exhibit micron-scale resolution without the use of any conventional optical lenses in the system that would otherwise provide optical magnification. In a lens-free imaging system, a semi-transparent sample is placed in close proximity to an imaging sensor, such as a charge-coupled device (CCD) or complementary metal-oxide-semiconductor (CMOS) imaging array and can be illuminated with one or more sources of light. The illumination will produce a diffraction pattern (also referred to as a "hologram") that propagates to, and is recorded by, the sensor. Recording the diffraction pattern may involve producing, with the sensor, a plurality of photocurrents or other electrical signals (e.g., voltages). Each photocurrent or other electrical signal is indicative of the optical intensity of a different spatial portion of the diffraction pattern. By recording the diffraction pattern at several distances from the sample, one or more suitable mathematical algorithms can be used to reconstruct an image of the sample at high resolution (e.g., with increments less than 10 μm, less than 5 μm, less than 4 μm, less than 3 μm, less than 2 μm or less than 1 μm).

Figure 1:
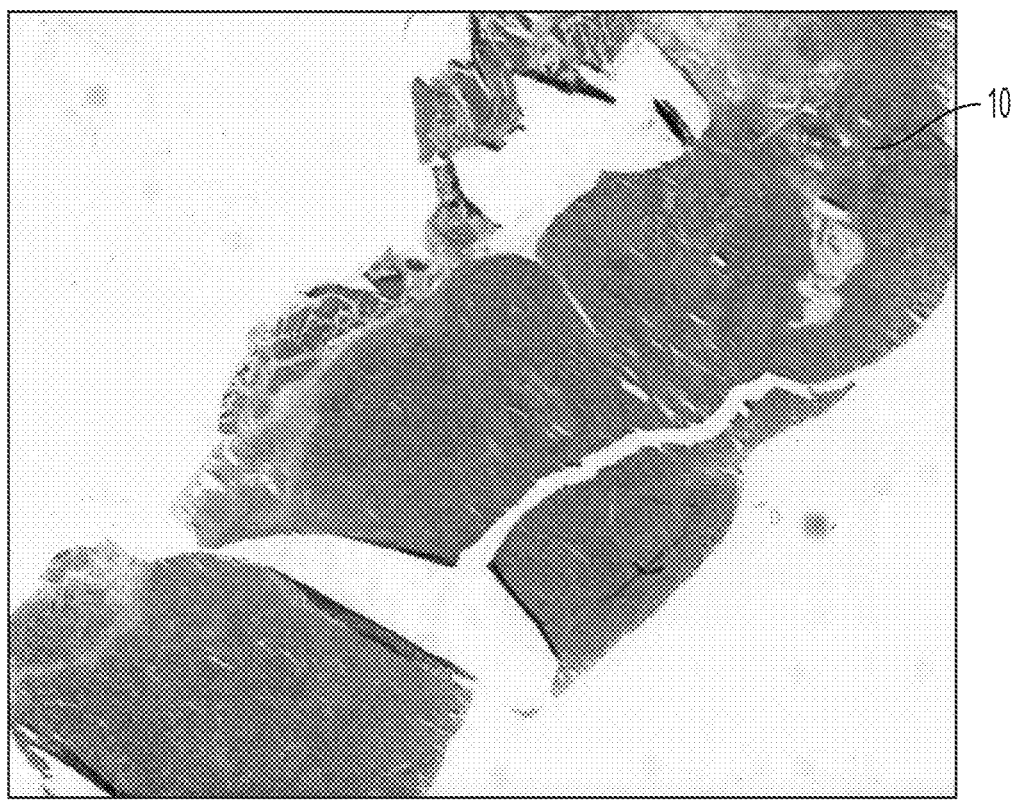
FIG. 1 depicts a tissue sample image in accordance with some embodiments of the technology described herein.

Imaging systems of the types described herein can be used to image samples, such as tissue samples extracted from a patient (e.g., a human or an animal). FIG. 1 shows an exemplary image of a sample 10 in accordance with some embodiments of the technology described herein. The samples may be taken from any tissue that indicates the presence or absence of a pathological condition. For example, the tissue image may be from a pancreas and may include a portion of a tumor or other abnormality. A high-resolution image of a tissue sample may provide evidence of the presence or absence of a disease or condition, such as cancer, Alzheimer's disease, Parkinson's disease, diabetes, cystic fibrosis, sickle cell anemia, or an autoimmune disease. For example and without limitation, the tissue may be from a tumor or from the liver, lung, breast, ovary, uterus, cervix, vagina, testicle, spleen, lymph node, bladder, kidney, brain, esophagus, stomach, intestine, gall bladder, mouth, lip, nose, pancreas, prostate, colon, skin, or any other organ that may be suspected of having a tumor. Tissue sample images may be captured using a lens-free diffraction imaging system of the present embodiments. Diffraction imaging systems may also be referred to as diffractive imaging systems. In the context of the disclosed technology, the term "diffraction" generally refers to a diffraction pattern produced by the sample and recorded by a sensor.

Figure 2A:
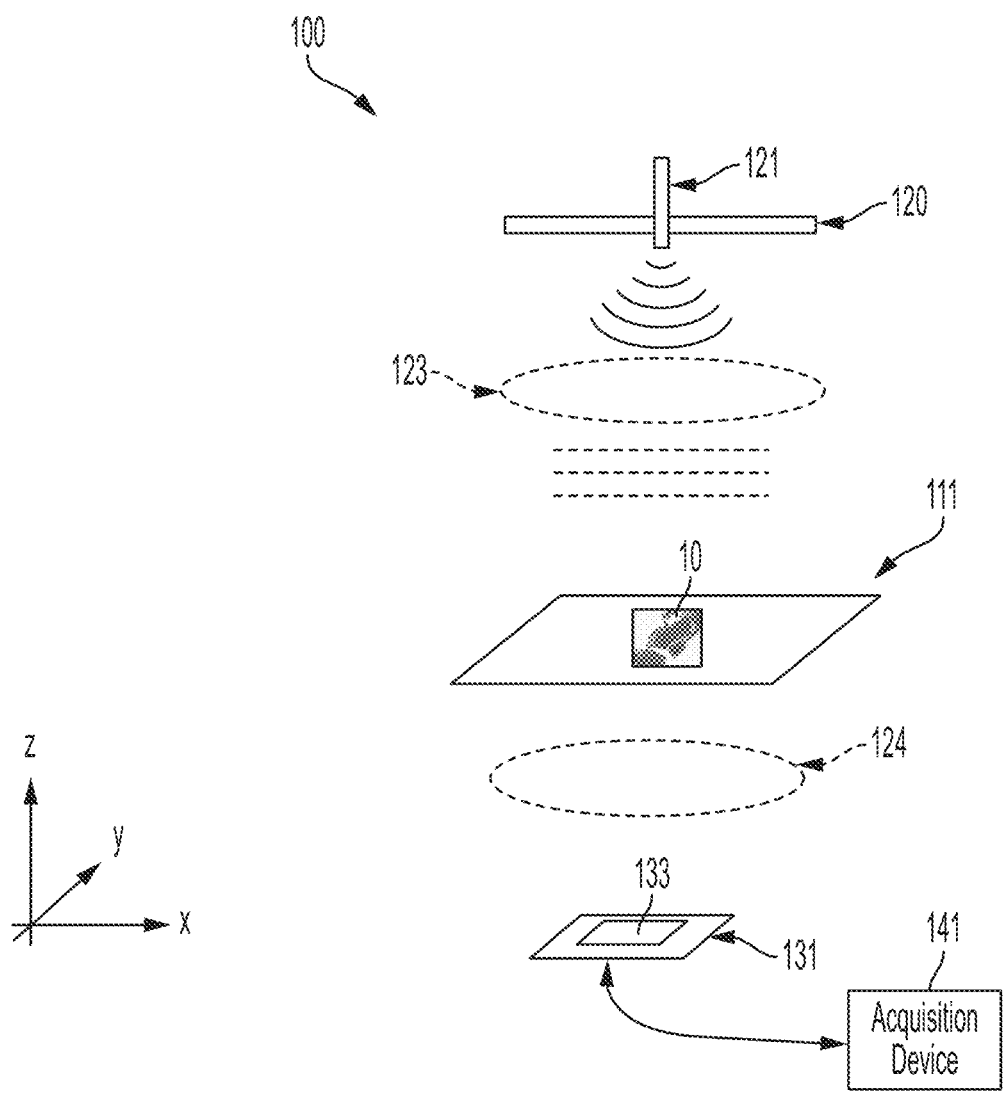
FIG. 2A depicts a diffraction imaging system, in accordance with some embodiments of the technology described herein.

FIG. 2A depicts an example of a diffraction imaging system 100 for generating an image of a sample (such as sample 10), according to some embodiments. Imaging system 100 can include a source support 120 configured to support one or more light sources 121, a sensor support 131 configured to support one or more sensors 133, and a sample support 111 configured to support one or more samples 10. In at least some of the embodiments in which more than one light source is used, such light sources may be disposed at different locations. In some embodiments, the source support 120 may be spaced from the sample support 111 along the z-axis (also referred to herein as the "imaging axis"). In some embodiments, the sample support 111 may be spaced from the sensor support 131 along the z-axis. In some embodiments, sample support 111 is positioned between source support 120 and sensor support 131 along the z-axis and is located closer to the sensor support 131 than the source support 120. Sample support 111 may hold a sample 10 generally along a plane (such as the x-y plane). For example, a sample may be disposed on a planar sample support 111 that is parallel or approximately parallel to the x-y plane, though the sample itself may have non-uniform thickness and exhibit some topography. In some embodiments, a plane may run through the entirety of sample 10, or may run through a majority of sample 10. In some embodiments, a sample 10 may lie along a planar sample support 111 such that a majority of the sample is within 100 microns from a surface of the planar support. In some cases, a sample 10 may be sandwiched between two components (such as coverslips) that retain the sample generally along a plane.

Although the diffraction imaging system 100 is depicted with a vertical orientation in FIG. 2A and other drawings where the sensor support 131 and sensor are located below the sample 10 and one or more light sources 121, a diffraction imaging system 100 can be implemented with other orientations. For example, a diffraction imaging system 100 may be inverted, compared to the system shown in FIG. 2A, such that the sensor support 131 is facing downward and located above the sample 10. Such an orientation may reduce the potential for debris or particles settling on the sensor(s) 133. In some implementations, the system orientation may be along a horizontal direction (e.g., along an x direction in reference to the drawing). In some cases, a first portion of the imaging axis may be along a first direction (e.g., the y direction), and a second portion of the imaging axis may be along a second different direction (e.g., the z axis) and a mirror may be used to fold the imaging axis. Folding the imaging axis one or more times may make a diffraction imaging system 100 more compact.

According to some embodiments, an imaging system 100 may operate in transmission mode. For example, illumination of the sample 10 may produce a diffraction pattern emerging from the plane of the sample and extending away from the light source(s) 121. To enable transmission through the sample support, the sample support may be transparent or at least partially transparent. In some embodiments, imaging system 100 may be lensless. For example, the imaging system may lack lenses between the sample and the sensor(s). In some embodiments, diffraction or holographic images may be formed on the sensor(s) and result from the interference between a reference beam and a diffracted beam emerging from the sample. The reference beam may be the zero-order mode of the diffraction pattern. By capturing multiple diffraction images with the sensor(s) 133 at multiple distances from the sample 10, amplitude and phase information for light at the sample can be reconstructed to thereby obtain at least one image of the sample.

II. Further Aspects of an Example Imaging System

Figure 2B:
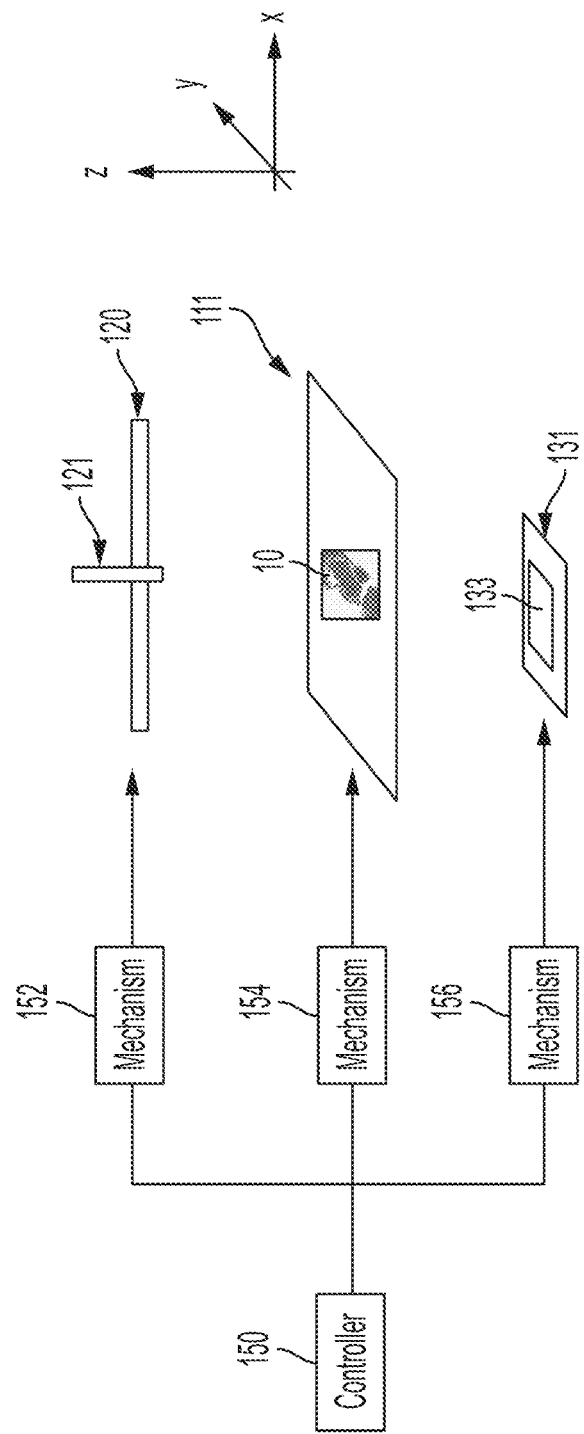
FIG. 2B depicts the diffraction imaging system of FIG. 2A including a plurality of mechanisms, in accordance with some embodiments of the technology described herein.

FIG. 2B illustrates mechanisms that may be used at least in some embodiments to control the relative position and/or orientation of light source 121, sample 10 and sensor(s) 133. In this example, mechanism 152 controls the position and/or orientation of source support 120, mechanism 154 controls the position and/or orientation of sample support 111 and mechanism 156 controls the position and/or orientation of sensor support 131. A controller 150 (such as one or more microprocessors, one or more microcontrollers, or computing system including at least one processor) can be programmed or adapted with hardware and/or code to control the mechanisms. For example, controller 150 may include computer instructions for operating the mechanisms 152, 154, 156 in accordance with a desired imaging procedure. These mechanisms may control the location of the corresponding support in one dimension (e.g., along the x-axis, y-axis or z-axis), two dimensions (e.g., in a x-y plane, x-z plane or y-z plane) or three dimensions (e.g., along each of the x-axis, y-axis and z-axis). Additionally, or alternatively, the mechanisms may control the orientation of the corresponding support, including yaw (rotation in a x-y plane, which may also be referred to as an "azimuthal" rotation), pitch (rotation in a x-z plane) and/or roll (rotation in a y-z plane).

Mechanisms 152, 154 and 156 may be implemented in any suitable way. For example, one or more of the mechanisms may include a piezoelectric stage, a stepper motor, an electromagnetic actuator, or a knob, among other types. The mechanisms may control the position of the corresponding support with fine resolution (e.g., with increments less than 10 μm, less than 5 μm, less than 4 μm, less than 3 μm, less than 2 μm or less than 1 μm) and/or with coarse resolution (e.g., with increments greater than 10 μm, greater than 100 μm, greater than 1 mm, or greater than 1cm). In some embodiments, the fine increments may be equal or smaller than the center-to-center separation between adjacent pixels of a sensor 133, thereby enabling sub-pixel image resolution.

In some embodiments, sample support 111 can be configured to support, and in some cases to position, a sample 10 at an imaging location 12. In some embodiments, sample support 111 can include a slide holder capable of holding one or more slides. Each of these slides can mount one or more samples. The slide holder can be configured to removeably attach the one or more slides to sample support 111. Sample support 111 can be configured to enable translation of the slide holder along each coordinate axis independently.

In some cases, one (or more) of the mechanisms may include a component for controlling the position of the corresponding support with fine resolution and another component for controlling the position of the corresponding support with coarse resolution. For example, fine translation along a coordinate axis can be provided by a linear stage providing micro-positioning or sub-micro-positioning, while coarse translation can be provided by a clamp, an adjustable spring clip, a conveyor belt, manual positioning of the slide on a supporting surface, or the like. As an additional non-limiting example, sample support 111 can include a linear stage for translating the slide holder along the z-axis, an independent linear stage for translating the slide holder along the y-axis, a conveyor belt for coarse translation of the slide holder along the x-axis. Sample support 111 may also be configured to adjust the orientation of the slide holder. For example, one or more of the yaw, pitch and roll of the slide holder may be adjustable using sample support 111. Sample support 111 may provide for coarse or fine adjustment of one or more of the yaw, pitch and/or roll of the slide holder. In some embodiments, coarse and/or fine translation along one or more of the coordinate axis can be computer-controlled. In other embodiments, coarse and/or fine translation along one or more of the coordinate axis can be manual.

Source support 120 can be configured to support, and in some cases position, one or more light sources 121 that are configured to illuminate the imaging location 12. A light source 121 can be part of source support 120 or connected to source support 120. In some embodiments, source support 120 can be configured to enable translation of light source(s) 121 at least approximately along the z-axis and/or in other directions. For example, source support 120 can be configured with an illumination axis (not shown in FIG. 2A). The position and orientation of light sources comprising source support 120 can be specified with respect to an imaging axis (e.g., the z axis). In some embodiments, the imaging system may include more than one light source 121. The light sources may be positioned at different locations, and each light source may be controlled to activate with a different timing (e.g., turned on at a different time when the other light sources are turned off). The timing with which each light source is activated may be controlled so as to emulate a single light source that moves to different locations. Thus, in some such embodiments, the mechanism for controlling the position of source support 120 may be omitted.

A light source 121 can provide light emitted by a light emission device, such as a laser, light emitting diode (LED), incandescent light, florescent light, halogen light, vertical-cavity surface-emitting laser (VCSEL), or other known light source. In some embodiments, a light source 121 can be configured to illuminate the imaging location 12 with light that is temporally coherent (or partially temporally coherent); the light source may further be spatially coherent (or partially spatially coherent), thereby providing light with the ability to optically interfere upon passing through the sample. In some cases, an optical system (such as one or more lenses 123) may be used to collimate or partially collimate an optical beam emerging from a light source to flatten the beam's wave fronts, and thereby provide an approximately planar wave front, as depicted in FIG. 2A. In some embodiments, image resolution is improved for light sources having higher temporal and spatial coherence. One way to improve temporal coherence of a light source is to include a narrow band-pass filter (e.g., a wavelength bandwidth less than 30 nm) between the light source and the sample. One way to improve spatial coherence of a partial spatially-coherent light source is to place the light source farther from the sample (e.g., more than 2 inches away).

In some embodiments, light source 121 can be configured to illuminate the imaging location 12 with light that is temporally coherent (or partially temporally coherent). For example, in some embodiments, light source 121 can be configured to provide light at a single wavelength or within a narrow range of wavelengths (e.g., using laser illumination with a wavelength bandwidth less than 10 nm). In some embodiments, light source 121 can be configured to provide multi-spectral illumination (e.g., an incandescent bulb, halogen bulb, or LED outputting a spectral bandwidth greater than 10 nm). In some aspects, light source 121 can be configured to provide light inside and/or outside the visible spectrum (e.g., ultraviolet, near infrared, and/or infrared).

In some embodiments, light source 121 can comprise a light emission device (such as a laser diode or light-emitting diode). In some embodiments, light source 121 can be operatively connected to a light emission device. For example, a fiber optic cable, light pipe, or another suitable transmission medium can optically couple light source 121 (such as an end of the fiber optical cable) to the light emission device, which may be mounted off of the source support 120. In some embodiments, light source 121 can be configured to reflect, diffract and/or refract light provided by the light emission device. For example, light source 121 can include a mirror configured to reflect light (e.g., light received from the light emission device) at least approximately along the imaging axis. The mirror can be a Micro-Electro-Mechanical Systems (MEMS) or micro-opto-electromechanical system (MOEMS) device, such as a MOEMS mirror array. In some cases, the mirror may be mounted in a galvanometer assembly. In some embodiments, light source 121 can include a spinning disk configured to produce multiple zones of illumination that sweep across the sample as the disk spins. In some instances, light source 121 can comprise a collimation device, such as a collimating mirror or lens.

In some embodiments, imaging device 100 can be configured to provide approximately unit magnification (though not all embodiments are limited in this respect as magnifications greater or less than one are also possible). Magnification can result from divergence of light from a light source 121. Magnification may be reduced by using a lens to collimate divergent light from the source. For example, light provided by light source 121 and received at the imaging location can have an approximately planar wavefront. The separation between light source 121 and imaging location 12 can depend, in some cases, on a diameter of light source 121 (e.g., a diameter of an aperture of light source 121). For example, when light source 121 is between 50 and 150 microns in diameter, the separation between light source 121 and imaging location 12 may be greater than three inches and in some cases less than 10 inches, or approximately these values. As an additional example, when light source 121 is between 5 and 15 microns in diameter, the separation between light source 121 and imaging location 12 may be greater than 0.3 inches and in some cases less than 2 inches, or approximately these values. In some implementations, the separation between light source 121 and imaging location 12 may be greater than 0.3 inches and in some cases less than 30 inches. In some embodiments, one or more mirrors may be inserted to fold the optical path between light source 121 and imaging location 12, thereby effectively extending the optical distance that separates them. In some embodiments, the smaller the diameter of light source 121, a shorter separation between light source 121 and imaging location 12 may be permitted while obtaining high image resolution. In some embodiments, a light source with high spatial coherence increases the imaging resolution of the system compared to a light source with lower spatial coherence.

In some embodiments, as described herein, imaging device 100 can be configured to provide greater than unit magnification at the sensor 133. In such embodiments, a separation between light source 121 and imaging location 12 can be determined from the desired degree of magnification. For example, the degree of magnification can be calculated as $m=(d_1+d_2)/d_1$, where $d_1$ is the distance between light source 121 and imaging location 12 and $d_2$ is the distance between imaging location 12 and sensor 133. Sensor(s) 133 can include an array of detection elements (e.g., photodetectors) configured to transduce light into an electrical signal (e.g., a measureable charge, voltage, or current). Sensor(s) 133 may include a memory to store measurements and a data link or input/output interface for communicating stored measurements to another device. For example, sensor 133 can include a charge-coupled device (CCD) or complementary metal-oxide-semiconductor (CMOS) sensor. In some cases, one or more of the sensors 133 may be a linear array of photodetectors (e.g., arranged as a row of photodetectors) that can be scanned to record a diffraction pattern. In some embodiments, sensor(s) 133 may include a micro-lens array and a color filter, such as a Bayer color filter or a blockwise RGB filter. In some embodiments, sensor(s) 133 may include a micro-lens array and may be configured to acquire black and white images. Such a sensor may not include a color filter. In some embodiments, sensor(s) 133 may lack a micro-lens array and/or a color filter. In some embodiments, sensor(s) 133 can include processing circuitry for reading out diffraction image data from detection elements. In some embodiments, sensor(s) 133 can be configured to at least temporarily store diffraction image data, and to communicate with acquisition device 141 to provide the diffraction image data to the acquisition device.

According to some embodiments, acquisition device 141 is configured to control operation of imaging device 100. Acquisition device 141 can be configured to calibrate imaging system 100, acquire diffraction image data from sensor 133, generate a sample image using the acquired diffraction image data, post-process the sample image, and/or generate an overall image of the sample from diffraction images corresponding to differing fields of view. In some implementations, acquisition device 141 may be configured to automatically determine a characteristic of a sample that is indicative of a health condition. For example, acquisition device 141 may be configured to recognize one or more types of defective tissue samples or cells (e.g., cancerous tissue samples or malformed cells). Alternatively, at least some of these steps can be performed by another device. For example, a cloud computing system (not depicted in FIG. 2A) can be configured to receive diffraction image data acquired by acquisition device 141 and perform one or more of: sample image generation, sample image post-processing, and updating of the overall image.

An acquisition device 141 can comprise one or more processors (e.g., a central processing unit, microprocessor, graphical processing unit, application specific integrated circuit, or the like) and one or more computer-readable memories (e.g., a hard drive, solid state drive, cache, or the like). The one or more computer-readable memories can contain instructions, such as one or more computer programs, that cause acquisition device 141 to perform functions described herein. In some embodiments, acquisition device 141 can be a component of imaging device 100. For example, imaging device 100 can include a built-in computing device configured to perform functions described herein. In some embodiments, acquisition device 141 can be configured to control the intensity of light source 121 (e.g., turn light source 121 on, off, or modulate the intensity of light source 121).

Optionally, one or more lenses 123 and/or mirrors may be disposed between light source 121 and sample 10. One or more lenses 123 and/or mirrors or other optical components may be included in an imaging system 100 to improve the quality of illumination light (e.g., to improve the uniformity of intensity over a large area) or to fold an illumination path and make the imaging system more compact. Still optionally, one or more lenses 124, mirrors, and/or other optical components may be disposed between sensor(s) 133 and sample 10. One or more lenses 123 and/or mirrors or other optical components may be included in an imaging system 100 to change the location of the sensor(s) and/or size of the diffraction image incident on a sensor. In some embodiments, no lenses are disposed between light source 121 and sample 10. In some embodiments, no lenses are disposed between sensor(s) 133 and sample 10. Mirrors disposed between the light source and sample may be planar, concave, convex, or may be designed to have another shape (e.g., a shape that improves uniformity of intensity at the sample location).

In operation, a lensless imaging system 100 such as that depicted in FIG. 2A can produce a high-resolution image of the sample 10 over a large field of view by capturing and processing multiple diffraction patterns produced by the sample. For example, the sample 10 and sensor 133 may be separated by a first distance $z_1$. One or more diffraction patterns at this distance can be captured by the sensor 133 and acquisition device 141. Multiple images with sub-pixel shifts can be captured as described above at the first distance $z_1$ to produce a super-resolution diffraction image for the first distance. A super-resolution diffraction image is an image that has sub-pixel resolution compared to a single image captured at the first distance. After acquiring one or more diffraction images at the first distance $z_1$, the sample 10 and sensor 133 may be separated by a second distance $z_2$. One or more diffraction patterns can be acquired at the second distance as was done for the first distance. The process can be repeated for a third separation distance, and may be done for additional separation distances. The acquired diffraction images for the different separation distances can then be processed to reconstruct an image of the sample 10. The reconstruction process involves iterative calculations of the optical field to determine amplitude and phase information of the optical field at the imaging location 12. Further details of sample image reconstruction processes are described in U.S. patent application No. 62/809,531 titled "Diffractive Imaging System," filed Feb. 22, 2019, which application is incorporated herein by reference in its entirety.

Tissue samples 10 that are inspected by the imaging systems of the present embodiments may include biopsied tissue obtained, for example, through core needle biopsy. The samples may be paraffin-embedded and may be sectioned into slices prior to staining. Tissue samples may be stained using any stain selected to highlight cellular structures or other features of interest useful in tissue analysis. The tissue samples may have been processed prior to capturing of images. For example, the tissue samples may have been fixed, stained, labeled, washed, or dehydrated. The tissue samples may be prepared by hematox-ylin and eosin stain (H&E stain). Examples of general staining methods include, but are not limited to, hematox-ylin and eosin (H&E), trichrome, periodic acid Schiff (PAS), autoradiography, enzyme histochemistry, immuno-fluorescence, and immunohistochemistry. Specific stains include, but are not limited to, acid fuchsin, Aldehyde Fuchsin, Alician Blue, Alizarin Red S, Alkaline Phosphatase, aniline blue, Azan Stain, biebrich scarlet, Bielschowsky Stain, Cajal Stain, chromotrope 2R, Congo Red, Cresyl Violet, Eosin, fast green FCF, Fontana-Masson, Giemsa Stain, Golgi Stain, Gomori Trichrome, Heidenhain's AZAN trichrome stain, Hematox-ylin, Iron Hematox-ylin, light green SF yellowish, Luna Stain, Luxol Fast Blue, Mallory Trichrome, martius yellow, Masson Trichrome, Melanin Stains, methyl blue, milling yellow, Movat's Pentachrome, Mucicarmine, Mucin Stains, Myloperoxidase (MPO), Nissl Stains, Nuclear Fast Red, Oil Red 0, orange G, Orcien Stain, Osmium Tetroxide, Papanicolaou Stain, Perl's Iron Stain, phloxine, Phosphotungstic Acid-Hematox-ylin (PTAH), picric acid, Picro-Sirius Red (polarized), ponceau 6R, Prussian Blue, Reticular Fiber Stain, Romanowsky Stains, Safranin 0, Schmorl's Stain, Silver Stains, Sudan Stains, Tartrazine, Toluidine Blue, Van Gieson, Verhoeff Stain, Von Kassa Stain, water blue, Weigert's Elastic Stain, Wright's Stain, and x-ylidine ponceau, among others.

The tissue samples may be immune-stained with anti-cytokeratin antibody. The tissue samples may be prepared by yet other methods. For example, a tissue sample may be prepared by Papanicolaou stain (Pap stain). A sample could optionally be labeled by antibodies or probes, e.g., either of which could be fluorescently labeled or conjugated to elemental isotopes for mass spectrometry. Tissue staining may comprise immunohistochemistry staining using, for example, labelled antibodies targeting proteins of interest or primary followed by secondary antibodies where the primary antibodies target proteins of interest and the secondary antibodies target the primary antibodies and carry, for example, a fluorescent or otherwise reporter detectable through known imaging techniques. Tissue staining such as immunohistochemistry may be performed on an automated platform such as those available from Ventana Medical Systems, Inc. (Tucson, Ariz.).

In some aspects of the technology described herein, the inventors have recognized and appreciated that some applications involve acquiring images of samples that are larger than a single sensor 133. The inventors have further recognized and appreciated that the speed with which diffraction imaging systems can acquire images of such large samples can be significantly increased by using multiple imaging sensors for imaging different areas of the sample in parallel and by translating the sensors together, relative to the sample being analyzed, in one planar direction. A "planar direction" is referred to as a direction that is parallel to the plane of the sample. Acquisition of a sample image according to such imaging systems may involve a recursive procedure in some embodiments. Each step (or at least some steps) of the recursive procedure may involve i) acquisition of several sub-images of different portions of a sample, and ii) translation of the sensors relative to the sample being analyzed. Collectively, each step may cover larger areas of the sample than would be the case for a single sensor, thus reducing the time needed to cover the entirety of the sample. When describing relative motion of components, a statement that a first component moves relative to a second component means that the second component is taken as a stationary frame of reference. Accordingly, either or both of the components could move relative to a stationary laboratory frame of reference.

The inventors have further recognized and appreciated that, in some embodiments, the complexity of diffraction imaging systems may be reduced by allowing multiple sensors to translate in only one planar direction. For example, assuming that the sample being analyzed lies in an x-y plane (i.e., a plane perpendicular to the z-axis), the imaging system may be designed to translate the sensors relative to the sample along the x-axis, but not along the y-axis. In some such embodiments, the extension of the sample in the y-axis may be covered by the fact that the system includes multiple sensors extending in the y direction, while the extension of the sample in the x direction can be covered using a single or multiple scans of the sensors along the x-axis.

In another aspect of the technology described herein, the inventors have recognized and appreciated that the speed of an imaging system can be further improved by positioning one or more sensors at an inclined angle relative to the sample to be analyzed. Positioning a sensor at an inclined angle is contrary to conventional imaging approaches where it has been thought that the sensor should be oriented parallel to a plane containing the sample to maintain good focus across the sensor. The inventors have recognized and appreciated that orienting a sensor at an inclined angle may eliminate the need for positioning apparatus that changes the separation distance between the sample 10 and sensor 133. Such embodiments may further reduce the complexity of an imaging system and result in a system for which scanning is executed in only one direction (e.g., the x direction).

III. Multi-Sensor Imaging Systems

Some embodiments relate to diffraction imaging systems including multiple sensors 133, an example of which is depicted in FIG. 3A through FIG. 4B. In some such embodiments, there may be two or more sensor arranged to receive diffraction patterns from different areas of the sample. The sensors may be mounted on apparatus, such that they are capable of being translated in the x-y plane relative to a sample 10. In some embodiments, the translation is along one direction only (e.g., in the positive or negative x direction), though in other cases larger sample areas may be covered by scanning in more than one direction.

It should be appreciated that translation of the sensors relative to the sample being analyzed may be achieved by moving the sensors while keeping the sample in a fixed position, by moving the sample while keeping the sensors in a fixed position, or by moving both the sample and the sensors (by different amounts and/or in opposite directions). Motion of the sensors may be performed using mechanism 156 and motion of the sample may be performed using mechanism 154 (see FIG. 2B). For example, apparatus may be configured to change a relative position between one or more sensors and the sample support, which may be achieved in any of the following ways: 1) by moving the sensor(s) while keeping the sample support in a fixed position, 2) by moving the sample support while keeping the sensor(s) at fixed position(s), or 3) by moving both the sample support and the sensor(s).

FIG. 3A is a top view illustrating a sample 10 and an array of three sensors $133_1$, $133_2$, $133_3$. In the illustration, the sample is depicted as semi-transparent so that the location and size of the sensors can be seen. In this example, only three sensors are depicted, though any other suitable number of sensors greater than one may be used. As illustrated in FIG. 3A, each sensor covers a different portion of sample 10. As a result, the system can cover, with one scan, greater sample areas relative to imaging systems having a single sensor. In some embodiments, the sensors may be arranged to cover the entirety of the y-axis extension of an expected or specified sample size. For example, a diffraction imaging system may include a specification for microscopic imaging of large area sizes (e.g., 8 mm×10 mm or larger) and include multiple sensors spanning one of the peripheral lengths (8 mm or 10 mm in this example) or a portion thereof. Alternatively, the sensors may be arranged to cover at least a y-axis extension for a sub-region of a sample 10.

According to some embodiments, the sensors $133_1$, $133_2$, $133_3$ can include two-dimensional arrays of detection elements (e.g., photodetectors). In some embodiments, the sensors may have the same geometries (e.g., same size, same number of pixels and/or same aspect ratio). In other embodiments, the sensors may have different geometries. In some cases, the sensors may overlap along an axis of extension, as depicted in FIG. 3A and FIG. 3B (overlapping in the y direction). As such, two or more of the sensors can record in part diffraction patterns from a same portion of the sample 10. The overlap may aid in spatially combining images from each sensor to one another (e.g., to align the images to each other and/or remove image rotation artifacts) so that the images can be stitched together to form a single image. In some implementations, the diffraction patterns may be combined to each other. In some embodiments, reconstructed images may be combined to each other to form a single image.

In operation, a first set of diffraction images may be recorded when the sensors $133_1$, $133_2$, $133_3$ are arranged at a first location, as illustrated in FIG. 3A. After translating the sensors relative to the sample in one direction, for example in the x-direction as shown in FIG. 3B, a subsequent set of diffraction images may be recorded. In this manner, diffraction images can be recorded for the entire sample or a large portion thereof by scanning or stepping the sensors along only one direction (e.g., either along the x axis or along the y axis, but not both). In some cases, some amount of scanning or stepping along an orthogonal axis (or axes) may be performed. For example and referring again to FIG. 3A, the sensors $133_1$, $133_2$, $133_3$ may scan or step along the positive and/or negative x-direction and then step in the positive and/or negative y-direction to cover a larger region of the sample. In some embodiments, movement in the one direction (e.g., along the x axis) may be over distances that are at least one-half the width (e.g., along the x axis) or at least one-half the length (e.g., along the y axis) of a sensor. It should be appreciated that the movement may be performed over distances that are less than one-half the width or length of a sensor, though this may reduce the efficiency of imaging, at least in some implementations. At each x-y location of the sensors where a diffraction image is recorded, the sensor-to-sample distance may be changed to obtain additional diffraction patterns at different sample-to-sensor distances for each location that will allow reconstruction of the sample image. In some implementations, sub-pixel-shifted images of diffraction patterns may be recorded for each x-y imaging position and each sample-to-sensor distance to allow generation of super-resolution diffraction images for each portion of the sample. A sub-pixel shifted image recorded for an x-y location is a second or subsequent recorded image that is shifted from a first recorded image at the x-y location by a non-integer pixel-to-pixel distance measured on center. For example, if B indicates the center-to-center distance between pixels, and β indicates an amount that is less than B, a sub-pixel shifted image can be shifted by a value of β+nB, where n is any integer number equal to or greater than zero.

In some embodiments, multiple sensors $133_1$, $133_2$, $133_3$ may be moved together. For example, if the sensors $133_1$, $133_2$, $133_3$ are disposed on a common sensor support 131, motion of the sensor support results in concurrent motion of the sensors. However, the sensors may be moved individually in other embodiments. In some embodiments, the sensors $133_1$, $133_2$, $133_3$ may be translated numerous times relative to the sample (e.g., more than two, more than ten, more than thirty, more than one hundred, etc.), thereby allowing for multiple scans of the sample. The number of steps and the extent to which the sensors are translated relative to the sample may depend upon the x-axis extension of the sample (or the x-axis extension of a region of interest of the sample).

In some embodiments, an imaging system may be configured to translate the sensors $133_1$, $133_2$, $133_3$ relative to the sample only along one direction (e.g., along the x axis) in a plane that is parallel or approximately parallel to the sample plane, e.g., the x-y plane. Accordingly, in some embodiments, one or more mechanisms may be configured to i) change a relative position of the sensors with respect to the sample support in a first direction (e.g., along the x axis) approximately parallel to the sample plane, and ii) fix a relative position of the sensors with respect to the sample support along a second direction (e.g., along the y axis) approximately parallel to the sample plane and approximately perpendicular to the first direction during an image acquisition procedure. For example, such mechanism(s) may be configured to permit motion along one direction (e.g., along the x axis) but may not permit, whether permanently or just during an image acquisition procedure, motion along another direction (e.g., the y axis). The direction of motion may, in some cases, be non-parallel (angled) to the sample plane by as much as between 0.1 degree and 3 degrees. In some implementations, the direction of motion may be parallel to the sample plane to within 0.5 degree. For example, the imaging apparatus may be configured to translate the sensors $133_1$, $133_2$, $133_3$ relative to the sample only along the x-axis, as depicted in FIGS. 3A-3B. Imaging systems designed to translate the sensors relative to the sample in only one direction in the plane may be significantly easier to implement relative to other systems.

In the example of FIG. 3A and FIG. 3B, the sensors $133_1$, $133_2$, $133_3$ are arranged in a staggered configuration. In this example, sensors $133_1$ and $133_3$ are aligned along the x-axis and offset along the y-axis. Sensor $133_2$ partially overlaps, along the y-axis, with sensor $133_1$ and partially overlaps, along the y-axis, with sensor $133_3$. Some embodiments may have more sensors. Some embodiments may have fewer sensors. According to some implementations, there may be at least two sensors that are offset along at least one axis. In some cases, two of the sensors may be offset along two axes.

Figure 4A:
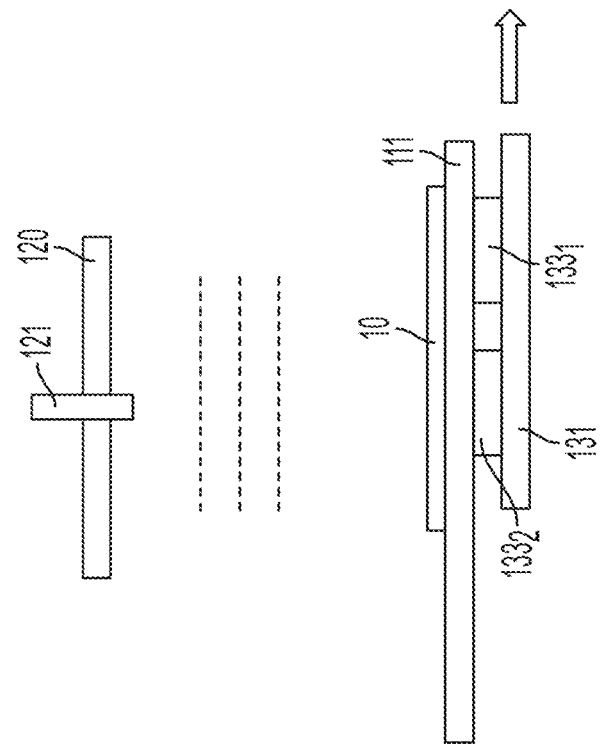
FIG. 4A and FIG. 4B are elevation views of the diffraction imaging system of FIG. 3A and FIG. 3B, in accordance with some embodiments of the technology described herein.
Figure 4B:
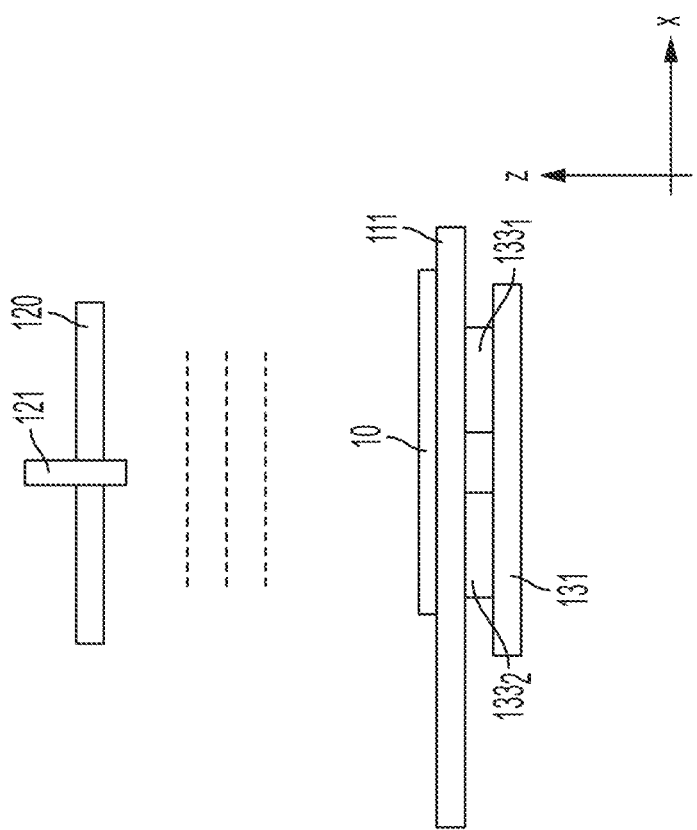

FIG. 4A is a side view corresponding to FIG. 3A, and FIG. 4B is a side view corresponding to FIG. 3B, in accordance with some embodiments. In this example, the sensors are disposed on a common sensor support 131 and the sample is disposed on sample support 111. Translation of the sensors relative to the sample, from the arrangement of FIG. 4A to the arrangement of FIG. 4B, may be achieved by moving sensor support 131 along the x-axis from left to right and/or by moving sample support 111 along the x-axis from right to left.

Figure 5A:
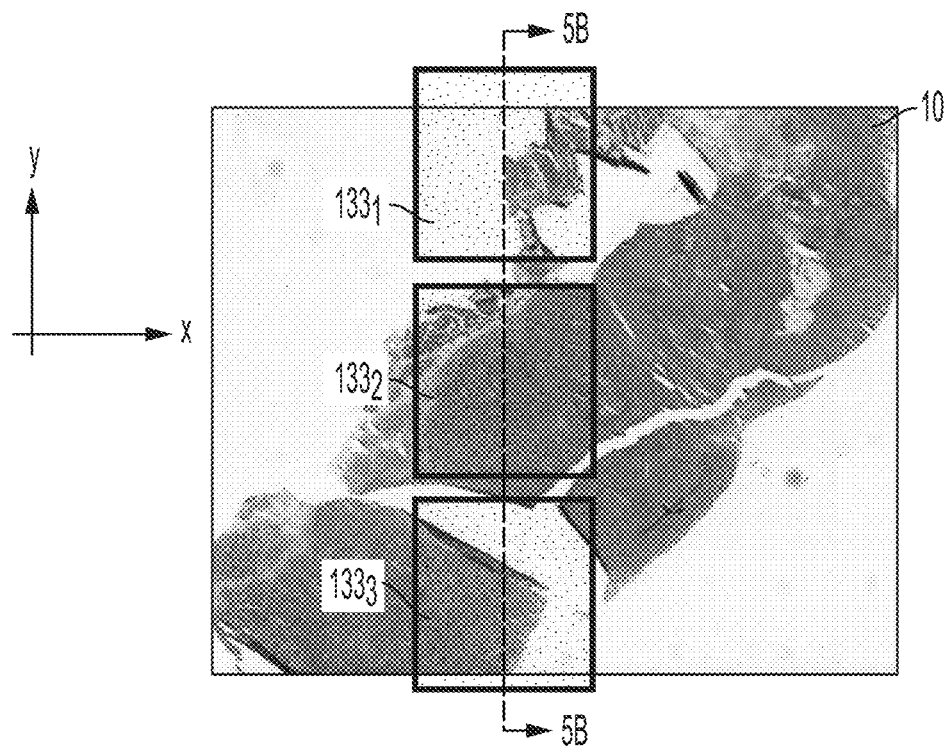
FIG. 5A is a top view illustrating multiple aligned sensors of a diffraction imaging system, in accordance with some embodiments of the technology described herein.

In another example, multiple sensors may be offset along one or two axes. In some cases, the sensors may be aligned along an axis, as shown in FIG. 5A. In this example, sensors $133_1$, $133_2$, $133_3$ are offset along the y-axis and z-axis and are aligned along the x-axis. In some embodiments, at least some of the sensors may be positioned at different heights along the z-axis. For example, with reference to the arrangement of FIG. 5B, sensors $133_1$, $133_2$, $133_3$ may be located at different heights relative to one another such that their centers may be located at different distances from a sample 10. In some cases, the planes of the sensors may be angled with respect to a plane of the sample. The angles of the sensor planes may be essentially the same as or different from each other. The illustration in FIG. 5B represents a cross section of sensors $133_1$, $133_2$, $133_3$ depicted in FIG. 5A, taken along the dashed line but not showing the sample below the sensors.

In some embodiments, having multiple sensors at different heights may ease the procedure for imaging a sample and can reduce the need for positioning apparatus that changes the sample-to-sensor distance. For example, in some such embodiments, fewer iterations in which the sensors are translated relative to the sample along the z-axis may be needed. In some embodiments, no iterations in which the sensors are translated relative to the sample along the z-axis may be needed when the sensors are offset along the z-axis. In this case, the imaging system may lack z-axis motion mechanisms, and translate sensors only in the x-y plane. For example, the sensors may be scanned in the y-direction such that each sensor scans over a same section of a sample. With the sensors at different heights, different interference patterns can be recorded for a same section of a sample for different sample-to-sensor distances without motion in the z-axis. The sensors may then be stepped in the x-direction to cover a larger area of a sample, for example to provide whole-sample or whole-slide imaging. In some embodiments, the arrangement of FIG. 5A may be used in combination with a z-axis motion mechanism, with sensors $133_1$, $133_2$, $133_3$ being positioned at different heights (as shown in FIG. 5B) or at the same height. In some such embodiments, sensors $133_1$, $133_2$, $133_3$ may be scanned several times at different heights. For example, sensors $133_1$, $133_2$, $133_3$ may first be scanned along the x-axis with the sensors positioned at a first height. Subsequently, the height of the sensors may be varied using a z-axis motion mechanism. Subsequently, a second scan along the x-axis may be performed. This process may be repeated multiple times. It should be appreciated that the multi-height arrangement of FIG. 5B is not limited to use in connection with the imaging system of FIG. 5A. In some embodiments, for example, the sensors of FIGS. 3A-3B may be disposed at different heights.

Figure 5B:
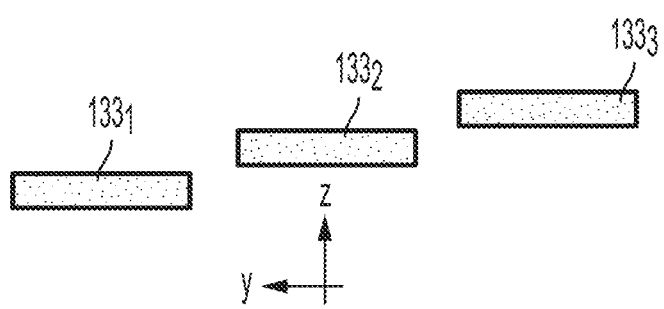
FIG. 5B is an elevation view illustrating multiple sensors located at different heights along an imaging or z-axis, in accordance with some embodiments of the technology described herein.

Although only three sensors are shown in FIG. 5A and FIG. 5B, more of fewer sensors may be used. For example, four or nine sensors (or any other number of sensors) located at one or more z-axis coordinates and distributed in an x-y array can be used in some embodiments. For a two-dimensional array of sensors, scanning in only one direction (e.g., x or y) may be used and z-axis scanning may not be performed if the sensors are tilted or offset along the z direction. In some implementations, the sensors may immediately abut or overlap adjacent sensors in an array, such that there are no gaps between detection areas of the sensors in the x and/or y directions.

Figure 6:
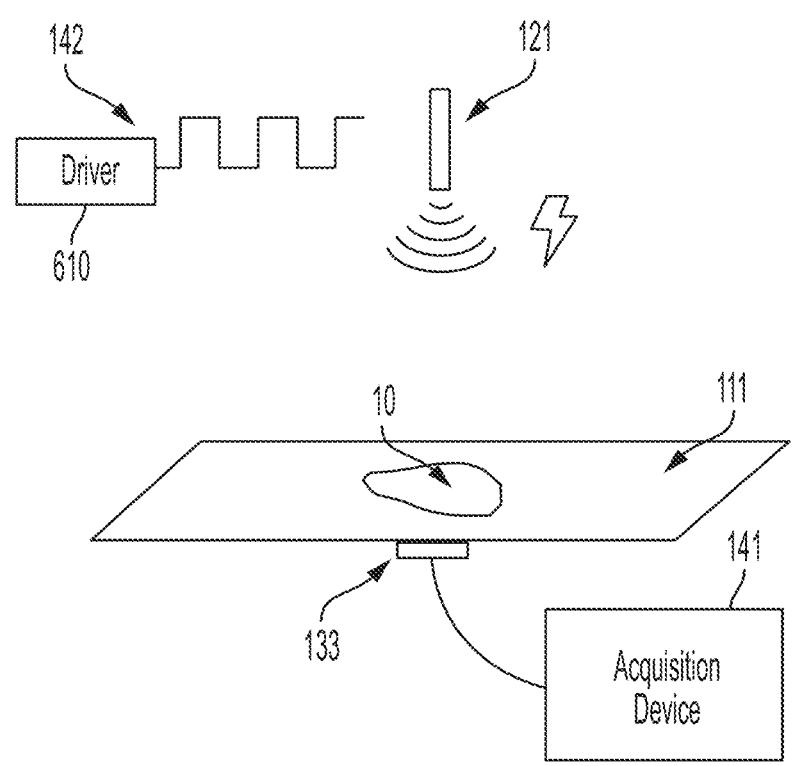
FIG. 6 depicts a diffraction imaging system configured to flash a light source, in accordance with some embodiments of the technology described herein.

The inventors have further recognized and appreciated that sources of motion (e.g., vibrations) may introduce blur in captured diffraction images and subsequently reduce sample image quality. FIG. 6 illustrates an example of a diffraction imaging system configured to generate an image by acquiring diffraction image data while flashing a light source 121 to reduce motion blur, in accordance with some embodiments of the technology described herein. The inventors have further recognized and appreciated that by periodically illuminating the sample (e.g., flashing) rather than continuously illuminating the sample, the sample may be exposed to less optical power, preventing or reducing damage to a sample such as a sensitive tissue and/or fluorescent material.

The imaging system of FIG. 6 includes a light source 121 and a light source driver 610 that may be configured to turn on and off the light source 121 periodically. For example, light source 121 may be configured to turn on and off periodically in response to a control or drive signal 142 from the driver 610. In some embodiments, signal 142 may be a programmable signal generated by a computing device (e.g., acquisition device 141) and output to the driver 610, which may amplify the signal. The "on" time may be brief and shorter than the "off" time. For example, the "on" duration can be greater than 1 picosecond and less than 10 milliseconds in some embodiments, less than 1 millisecond in some embodiments, less than 1 microsecond in some embodiments, and yet less than 1 nanosecond in some embodiments.

In some embodiments, for example where a sensor 133 is configured with a rolling electronic shutter (e.g., arranged as a CMOS sensor, though other electronic or non-electronic shutters may be used), signal 142 may be synchronized with a common exposure period for all pixels of sensor 133. For example, a rolling shutter of sensor 133 may have a total exposure time of 30 ms, with a 10 ms delay between exposure of a first row of pixels and a last row of pixels. An exposure period may be a period of time during which the sensor 133 accumulates signal from the sample to record a diffraction pattern. A common exposure period for sensor 133 may be a 20 ms period after the initial 10 ms delay. Signal 142 may be configured to turn light source 121 on during this 20 ms common exposure period so that all pixels may be exposed uniformly. In some implementations, the signal 142 may turn the light source off when the sensor 133 is not accumulating signal from the sample. It may be appreciated that the foregoing is simply an example and that the exposure time of a sensor with a rolling shutter may have any duration from microseconds to seconds.

In some embodiments, light source 121 may be configured to produce increased intensity during "on" periods when configured to turn on and off periodically as compared to a light source in continuous operation. Having an increased intensity of flashed light during "on" periods compared to an intensity level of a continuously-on light source may improve sample image quality. For example, light source 121 may be configured to produce twice as much light intensity during an "on" period as a light source configured to continuously illuminate sample 10. By flashing the light source on at higher intensity for a brief period of time (e.g., during an exposure time for an imaging array), a higher signal-to-noise ratio may be obtained without damaging a sample compared to a light source that is on continuously. The duration of an individual flash may be, for example, between 1 ps and 1 s, between 1 ps and 100 ms, between 1 ps and 10 ms, between 1 ps and 1 ms, or between 1 ps and 100 μs. The duty cycle may be, for example, between 10% and 90%, or in any range within this range.

Figure 7A:
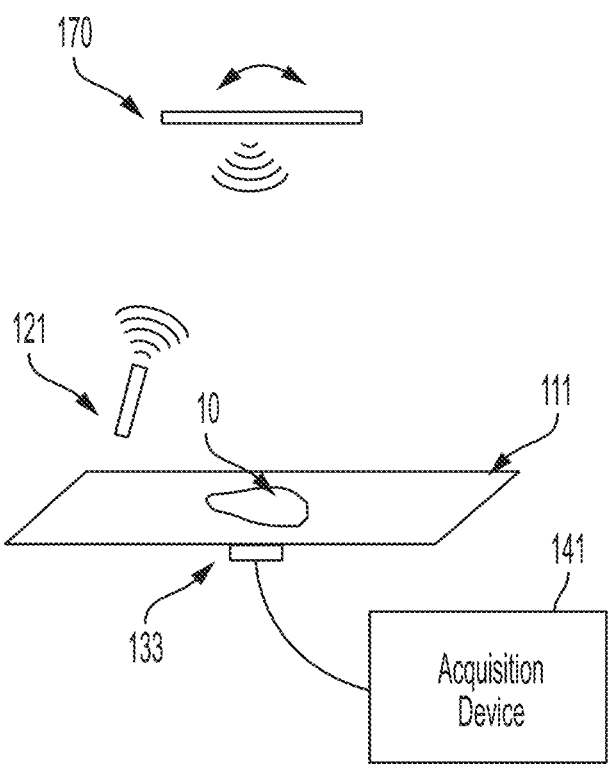
FIG. 7A and FIG. 7B depict diffraction imaging systems including adjustable mirrors, in accordance with some embodiments of the technology described herein.

The inventors have also recognized and appreciated that diffraction images that are shifted by a sub-pixel amount may be produced by steering the light produced by the light source 121 in some embodiments, rather than shifting the sample 10 or sensor 133 by sub-pixel amounts. FIG. 7A illustrates an example of a diffraction imaging system configured to acquire sub-pixel-shifted diffraction image data using varying angles of illumination, in accordance with some embodiments of the technology described herein. The imaging system of FIG. 7A includes a light source 121 optically coupled with an optical steering element 170. Optical steering element 170 may direct the light produced by light source 121 onto sample 10. Optical steering element 170 may be programmably controlled by a computing device such as, for example, acquisition device 141.

Optical steering element 170 may be configured to change the angle of illumination of sample 10 in response to an electronic signal. Optical steering element 170 may, in some embodiments, comprise a mirror galvanometer which may be configured to change the angle of a mirror in response to an electronic signal and provide a rapid change in the incident angle of light on the sample 10 and sensor 133. The optical steering element 170 may have an angular resolution between, for example, 0.0004° and 0.008°. In some embodiments, a mirror galvanometer may provide rotation of a mirror 170 about more than one axis.

Figure 7B:
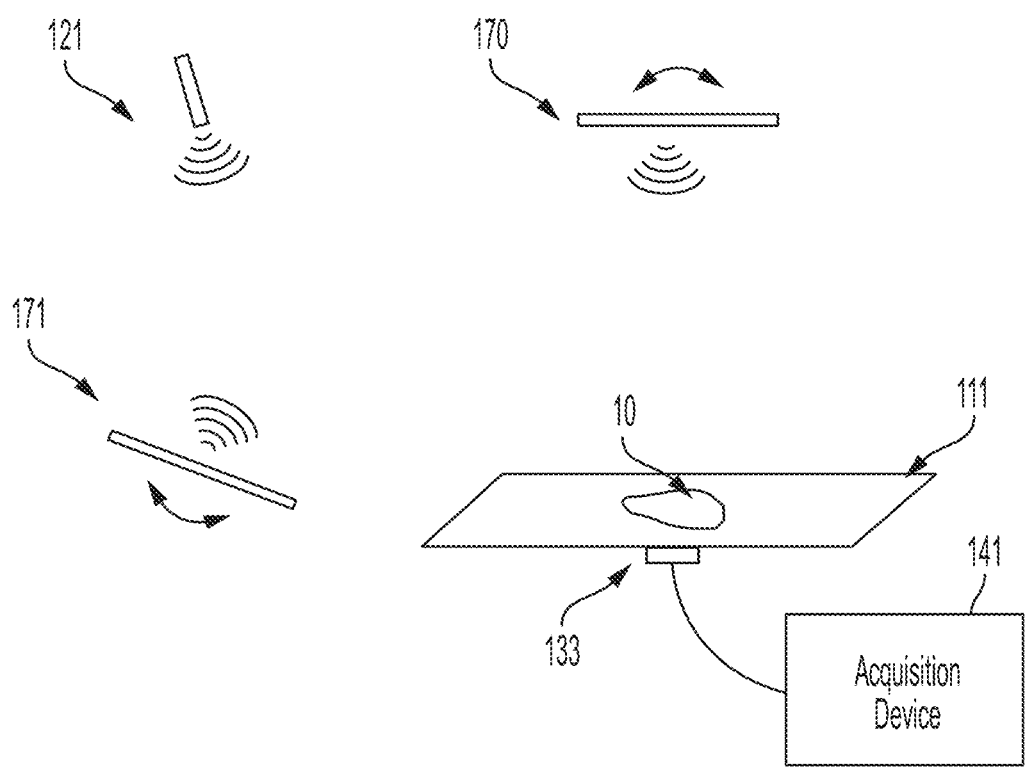

In some embodiments, more than one rotating mirror may be used, as depicted in FIG. 7B. Light from source 121 may be reflected from a first moving mirror 171 and then from a second moving mirror 170 before it is incident on a sample (not shown) and sensor 133. In some implementations, both mirrors may be mirror galvanometers which can provide rapid rotation of the mirrors. By using two mirrors, the virtual image location and incident angle of the light source 121 can be changed. In some cases, at least one of the mirrors may rotate about two essentially orthogonal axes. In embodiments, a rotating mirror may be driven in incremental rotation steps, wherein rotation by one increment causes a sub-pixel shift in a diffraction image recorded by a sensor 133.

Figure 8C:
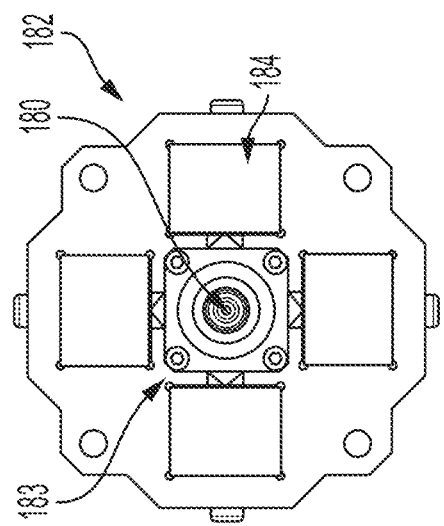
FIG. 8B and FIG. 8C depict positioning apparatus for a light source of a diffraction imaging system, in accordance with some embodiments of the technology described herein.
Figure 8B:
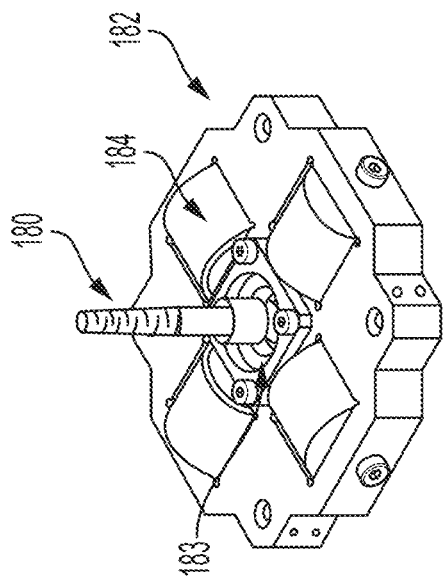
Figure 8A:
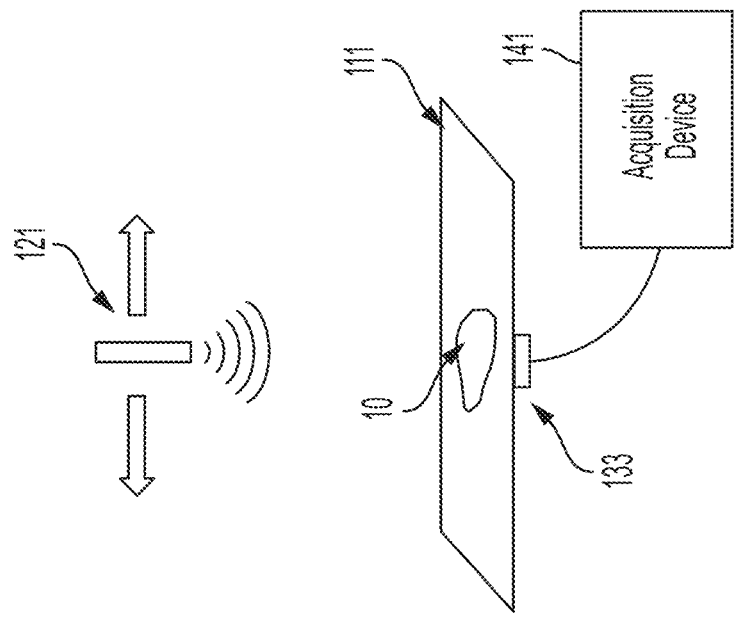
FIG. 8A depicts a diffraction imaging system configured for sub-pixel resolution, in accordance with some embodiments of the technology described herein.

Additionally, or alternatively, the inventors have appreciated that sub-pixel shifts of the diffraction images and sub-pixel resolution may be obtains by using a translation stage to move the light source 121, in accordance with some embodiments. For example, light source 121 may be translated in an x-y plane to generate images with sub-pixel resolution, as depicted in FIG. 8A. FIG. 8B and FIG. 8C illustrate a perspective view and a plan view, respectively, of a device for sub-pixel shifting of diffraction images, in accordance with some embodiments. In this example, an end of an optical fiber 180 (which can receive light from a light-emitting device) is connected to a translation stage 182 via a connector 183. In other embodiments, a light-emitting device itself (e.g., an LED or laser diode) can be mounted on the translation stage 182.

In some embodiments, translation stage 182 may use one or more electromagnetic actuators to produce motion in one or more directions that are parallel or approximately parallel to a plane containing the sample 10. In response to application of a signal (e.g., a voltage), electromagnetic actuators 184 translate the connector 183 and optical fiber 180 between one or more predefined positions. Actuators 184 may be configured to produce reproducible motion. For example, actuators 184 may be configured to operate within less than or equal to 10% error. In some embodiments, translation stage 182 enables motion of the optical fiber 180 (or motion of a light-emitting device) with minimum increments that are greater than the center-to-center separation between adjacent pixels of a sensor 133. In some cases, translation stage 182 enables motion of the optical fiber 180 with minimum increments that are less than or equal to the center-to-center separation between adjacent pixels of a sensor 133. According to some embodiments, a minimum increment of motion of the light source may cause a sub-pixel shift of a diffraction image recorded by a sensor 133.

IV. Angled Imaging Systems

The inventors have recognized and appreciated that the complexity of an imaging system may be reduced by positioning at least one sensor 133 with an angle relative to the sample 10 to be analyzed. One such example is illustrated in FIG. 9A and FIG. 9B, in accordance with some embodiments. In this example, sample 10 lies in an x-y plane while detection elements of sensor 133 lie in a plane that is angled relative to the x-y plane. As a result, different portions of the sensor 133 are at different distances (along the z-axis) from the plane containing the sample 10. It should be appreciated that, in other embodiments, the sensor 133 can lie in an x-y plane while sample 10 lies in a plane that is angled relative to x-y plane. In yet other embodiments, both sample 10 and sensor 133 can be angled relative to x-y plane. An angle (between the sample plane and sensor plane can be between 0.5 degrees and 60 degrees, according to some embodiments. In some cases, an angle (can be between 10 degrees and 40 degrees. In some embodiments, it may be desirable to make angle (small to reduce the amount of interpolation performed for tilt correction. For example, an angle (may be less than 10 degrees or less than 1 degree. In some embodiments, it may be desirable to make angle (large to enhance the difference in height between one side of the sensor and another. For example, the tilt angle may be such that one side of the sensor is between 200 microns and 2000 microns higher than the other side of the sensor. Thus, in some embodiments, an angle (may be chosen based on these considerations.

In some embodiments, sensor 133 and sample 10 may be angled relative to each other in two dimensions. For example, sensor 133 (or sample 10) may lie in a plane that is angled relative to the x-y plane by a first angle that rotates around the y-axis and also a second angle that rotates around the x-axis.

Imaging systems in which a sensor 133 is angled relative to a sample 10 may enable multi-height diffraction image acquisition with phase diversity without having to move any part of the system along the z-axis. Having an angled sensor 133 and sample 10 as shown in FIG. 9A can reduce the overall mechanical complexity and cost of the system. In some embodiments, an imaging system with an angled sensor 133 and sample 10 (as depicted in FIG. 9A) may provide for z-directed motion to permit changing a sample-to-sensor distance. In such a system, a number and/or amount of z-directed motions may be reduced compared to an imaging system in which the sensor 133 and sample 10 are essentially parallel.

In operation and referring to FIG. 9A, a sensor 133 may be located at a first position relative to sample 10 and diffraction image data recorded for the first position. At the first position, different portions of the sample will be at different distances from portions of the sensor that record corresponding diffraction patterns. For example, at the first illustrated position, a first portion 10a of the sample 10 will be a distance $z_1$ from a portion 133a of the sensor 133 that records a diffraction pattern produced at least in part by the first portion 10a of the sample. The sensor 133 may be moved laterally (e.g., in one direction only such as the x-direction) to one or more additional positions. At a second position, depicted in FIG. 9B, a second portion 133q of the sensor 133 is located a distance $z_2$ from the first portion 10a of the sample 10 and can record a second diffraction pattern for that portion of the sample. In this manner, multiple diffraction patterns for a same portion of the sample can be obtained for different sample-to-sensor distances by only scanning the sensor 133 or sample 10 in one direction. Diffraction image data obtained at different sample-to-sensor distances can be processed to reconstruct a sample image, as described above. At each imaging location, multiple sub-pixel shifted diffraction images can be obtained using any of the methods described above to produce super-resolution diffraction images and improve sample image quality.

Figure 9C:
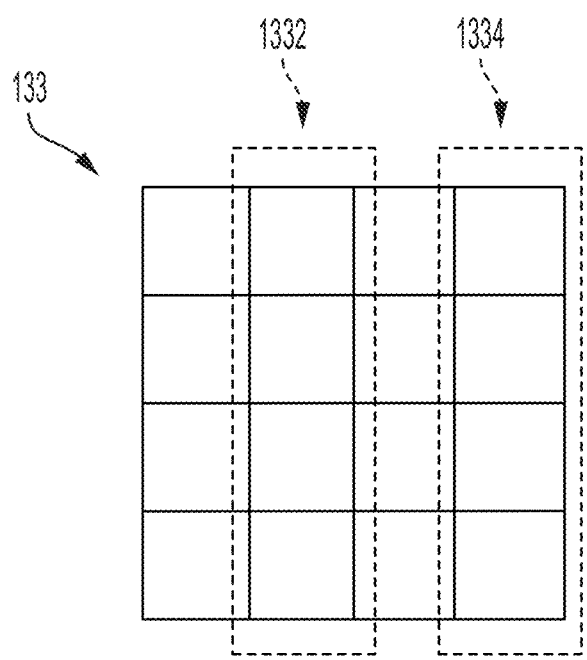
FIG. 9C is a top view of a sensor, in accordance with some embodiments of the technology described herein.

FIG. 9C depicts an example of a sensor 133, which, for the sake of illustration, is divided into 16 sections. Each section may include one or more detection elements (e.g., photodetectors). When processing acquired diffraction image data, data from sections of a sensor 133 may be grouped and processed together. For example, when data is acquired at a first sensor location, all data derived from a first column (e.g., column $133_2$) of sensor sections may be grouped as a first partial diffraction image of the sample 10. Referring again to FIG. 9A, it can be appreciated that all detection elements within a column are approximately a same distance from the sample plane. When data is acquired at a second sensor location, all data derived from a second column (e.g., column 1334) of sensor sections may be grouped as a second partial diffraction image of the sample 10 that is obtained for a same portion of the sample as the first partial diffraction image data. When reconstructing a sample image, these partial diffraction images for a same portion of the sample can be processed to reconstruct a portion of the sample image. Executing the same processes for additional portions of the sample and other portions of the sensor allows reconstruction of additional portions of the sample image. The reconstructed portions of the sample image can then be stitched together computationally to obtain large-area, high-resolution images of the sample.

In practice, a reconstructed image of a portion of the sample may not be entirely in focus because of the tilt angle α between the sensor 133 and sample 10. For example and referring to FIG. 9A and FIG. 9C, detection elements on the left of a column $133_2$ of sensor sections will be farther from the sample plane than detection elements on the right of the column of sensor sections. These differences in distances can be accounted for computationally when processing the diffraction images. For example, after phase and amplitude information is determined for the electromagnetic fields for each diffraction image, and by knowing the amount of tilt between the sensor 133 and sample 10, an electromagnetic field for one of the diffraction images can be back-propagated to the sample plane by different amounts across a column $133_2$ to reconstruct an in-focus sample image. For example, diffraction features obtained from a left side of a column $133_2$ of sensor sections can be propagated back a larger distance than diffraction features obtained from a right side of a column $133_2$ of sensor sections. Alternatively, once amplitude and phase information are known, diffraction images can be rotated to parallel with the sample plane before back-propagating the field to the sample plane.

One or more tilted sensors 133 may be used in other imaging system configurations described herein. For example, tilted sensor(s) 133 may be used in any of the systems of FIGS. 3A-3B, FIGS. 4A-4B, FIGS. 5A-5B, FIG. 6, FIGS. 7A-7B, and FIGS. 8A-8C.

The foregoing description of implementations provides illustrations and description, but is not intended to be exhaustive or to limit the implementations to the precise form disclosed. Modifications and variations are possible in light of the above teachings or may be acquired from practice of the implementations. In other implementations the methods described above may include fewer operations, different operations, differently ordered operations, and/or additional operations. The components of the imaging devices depicted in the illustrations are similarly intended to be examples.

It will be apparent that example aspects, as described above, may be implemented in many different forms of software, firmware, and hardware in the implementations illustrated in the figures. Further, certain portions of the implementations may be implemented as a "component" that performs one or more functions. This component may include hardware, such as a central processing unit (CPU), graphical processing unit (GPU), image signal processor (ISP), an application-specific integrated circuit (ASIC), or a field-programmable gate array (FPGA), a microcontroller, a programmable logic device (PLD), etc. or a combination of hardware and software. As one example, positioning apparatus may be controlled with a microcontroller, and image data may be processed with an FPGA or ISP.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. Approximately, as used herein, is intended to mean within 10% of a nominal value, consistent with the understanding of one of skill in the art.

What is claimed is:

1. A diffractive imaging system, comprising:
a light source;
a sample support configured to hold a sample along a first plane;
a first sensor comprising a plurality of pixels disposed in a second plane that is tilted at an inclined angle relative to the first plane, wherein the first sensor is arranged to record diffraction images of the light source from the sample; and
a mechanism configured to vary a relative lateral position, in a direction that is approximately parallel to the first plane, of the first sensor with respect to the sample support.

2. The diffractive imaging system of claim 1, wherein the mechanism is configure to vary the relative lateral position of the first sensor relative to the sample support by moving the first sensor along the first direction.

3. The diffractive imaging system of claim 2, wherein the mechanism is configured to move the first direction.

4. A diffractive imaging system, comprising:
a light source;
a sample support configured to hold a sample along a first plane; and
a first sensor comprising a plurality of pixels disposed in a second plane that is tilted at an inclined angle relative to the first plane, wherein the first sensor is arranged to record diffraction images of the light source from the sample, wherein there are no lenses between the sample support and the first sensor.

5. The diffractive imaging system of claim 1, further comprising a second sensor comprising a plurality of pixels disposed in a third plane that is tilted at an angle with respect to the first plane, wherein the second sensor is arranged to record diffraction images of the light source from the sample.

6. The diffractive imaging system of claim 5, wherein the first sensor and second sensor are configured to move relative to the sample support along a first direction that is approximately parallel to the first plane.

7. The diffractive imaging system of claim 6, wherein the first sensor and second sensor are configured to move relative to the sample support along the first direction and record diffraction patterns from a same portion of the sample.

8. The diffractive imaging system of claim 1, further comprising a light source driver configured to cause the light source to flash on and off.

9. The diffractive imaging system of claim 8, wherein the signal is synchronized with an exposure time for the first sensor.

10. The diffractive imaging system of claim 1, further comprising positioning apparatus arranged to move the light source.

11. The diffractive imaging system of claim 10, wherein the positioning apparatus comprises an electromagnetic actuator configured to move the light source in a first direction that is approximately parallel to the first plane.

12. The diffractive imaging system of claim 1, further comprising at least one rotating mirror that is arranged to change an incident angle of radiation from the light source on the sample.

13. The diffractive imaging system of claim 12, wherein the rotating mirror is driven by a galvanometer.

14. The diffractive imaging system of claim 1, further comprising an acquisition device comprising at least one processor adapted to:
partition diffraction image data from the sensor into a plurality of groups corresponding to different sections of the sensor; and
determine an image for a same portion of the sample based on first diffraction image data from a first section of the sensor and second diffraction image data from a second section of the sensor different from the first section.

15. A diffractive imaging system, comprising:
a light source;
a sample support configured to hold a sample along a first plane;
a first sensor comprising a plurality of pixels disposed in a second plane that is tilted at an inclined angle relative to the first plane, wherein the first sensor is arranged to record diffraction images of the light source from the sample; and
an acquisition device comprising at least one processor adapted to:
partition diffraction image data from the sensor into a plurality of groups corresponding to different sections of the sensor;
determine an image for a same portion of the sample based on first diffraction image data from a first section of the sensor and second diffraction image data from a second section of the sensor different from the first section; and
compensate for the angle when computing an in-focus image for the sample.

16. A method for imaging a sample on a sample support that is configured to hold the sample along a first plane, comprising:
illuminating the sample using a light sources;
recording a first diffraction pattern of the light source from the sample with a first sensor arranged in a second plane that is tilted at an inclined angle relative to the first plane;
varying a relative lateral position, in a direction that is approximately parallel to the first plane, of the first sensor with respect to the sample support;
subsequent to varying the lateral position, recording a second diffraction pattern of the light source from the sample with the first sensor; and
reconstructing a microscopic image of a portion of the sample using a first portion of the first diffraction pattern that was recorded by a first portion of the sensor and a second portion of the second diffraction pattern that was recorded by a second portion of the sensor different from the first portion of the sensor.

17. The method of claim 16, further comprising determining a characteristic of the sample based at least on the microscopic image.

18. The method of claim 16, further comprising modulating the light source on and off in synchronization with a shutter of the sensor.

19. The method of claim 16, further comprising:
rotating a mirror to change a virtual image location of the light source; and
recording a second diffraction pattern from the sample with the first sensor.

20. The method of claim 19, further comprising constructing a sub-pixel resolution diffraction image based on the first diffraction pattern and the second diffraction pattern.

21. The method of claim 16, further comprising:
changing a location of the light source with an electromagnetic actuator; and
subsequent to changing the location of the light source, recording a third diffraction pattern from the sample with the first sensor.

22. The diffractive imaging system of claim 15, wherein there are no lenses between the sample support and the first sensor.

23. The diffractive imaging system of claim 15, further comprising a second sensor comprising a plurality of pixels disposed in a third plane that is tilted at an angle with respect to the first plane, wherein the second sensor is arranged to record diffraction images of the light source from the sample.

* * * * *